United States Patent [19]

Jacoby et al.

[11] 4,131,204
[45] Dec. 26, 1978

[54] POSITIVE-LOCKING RELEASABLE CONNECTOR FOR STORAGE RACK HAVING VERTICALLY ADJUSTABLE LOAD SUPPORTS

[75] Inventors: Peter H. Jacoby, Perkasie; Carl G. Seiz, Hatfield, both of Pa.

[73] Assignee: Seiz Corporation, Perkasie, Pa.

[21] Appl. No.: 633,676

[22] Filed: Nov. 20, 1975

[51] Int. Cl.² ............................................. A47F 5/10
[52] U.S. Cl. .................................................. 211/192
[58] Field of Search ............... 211/176, 177, 182, 183, 211/148; 248/188.2, 188.4, 243, 235, 304, 244; 52/758 R, 758 F; 85/1 H, 3 R, 9 R; 151/37, 47.35, 41.7

[56] References Cited

U.S. PATENT DOCUMENTS

| | | | |
|---|---|---|---|
| 348,235 | 8/1886 | Pope | 211/176 |
| 1,358,688 | 11/1920 | Lyon | 85/1 H |
| 1,616,437 | 2/1927 | Brock | 85/9 R X |
| 1,846,400 | 2/1932 | MacFarlane | 85/3 R |
| 1,955,353 | 4/1934 | Wiley | 85/9 R |
| 2,379,752 | 7/1945 | Schultz | 248/235 |
| 2,833,326 | 5/1958 | Knohl | 151/37 |
| 3,078,899 | 2/1963 | MacLean et al. | 151/37 |
| 3,463,525 | 8/1969 | Stewart | 52/758 F |
| 3,527,436 | 9/1970 | Stone et al. | 248/188.4 |
| 3,741,405 | 6/1973 | McConnell et al. | 211/177 |
| 3,840,192 | 10/1974 | Hendrickson | 85/9 R X |
| 3,877,579 | 4/1975 | Weider | 211/176 |

*Primary Examiner*—James T. McCall
*Assistant Examiner*—Terrell P. Lewis
*Attorney, Agent, or Firm*—Stanley B. Kita

[57] ABSTRACT

A storage rack having a column with a front flange and side flanges engageable by a clip mounted at one end of a load support is provided with an improved locking assembly for releasably fastening the load support clip to the column. The locking assembly includes an L-shaped connector member comprising a threaded shank extending through a hole in the clip and through one of a row of apertures in the front flange of the column and a lug engaged inside the column. A nut threadedly engaged with the shank has an integral annular flange which engages the front of the clip when the lug engages the rear of the front flange of the column. The lug is bent at less than an orthogonal included angle with respect to the shank from a material which affords elastic flexure of the lug relative to the shank when the nut is tightened to provide a locking action. The lug is dimensioned lengthwise so as to engage the side flange of the column for cooperating therewith to prevent rotation of the shank when the nut is tightened and loosened.

3 Claims, 5 Drawing Figures

U.S. Patent  Dec. 26, 1978  4,131,204
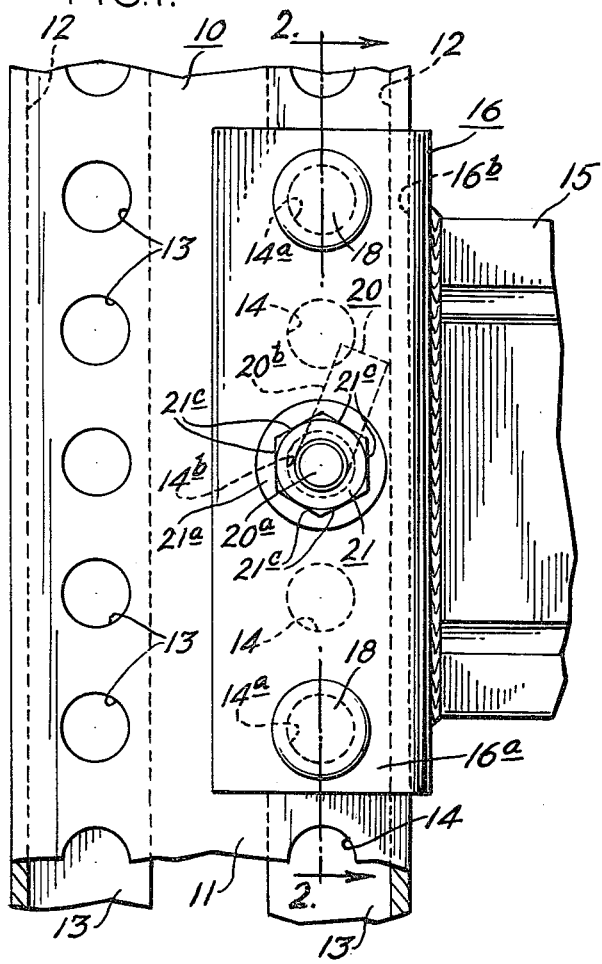
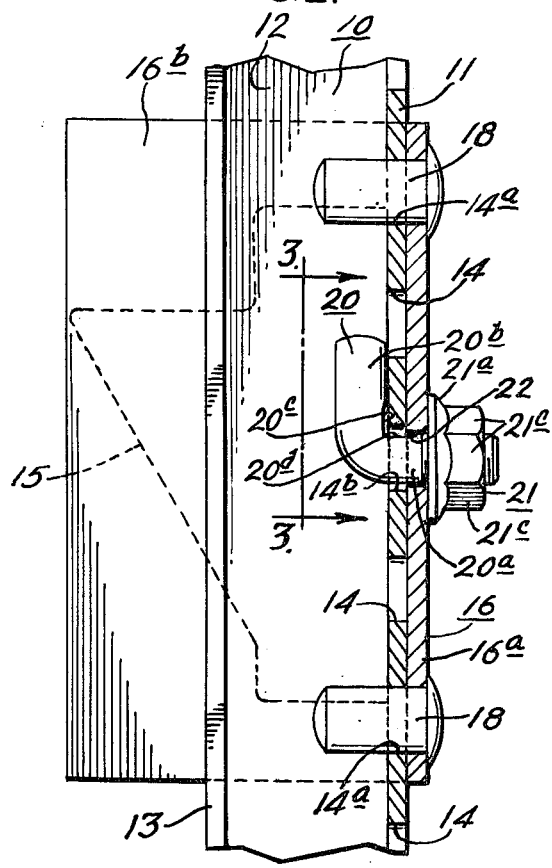
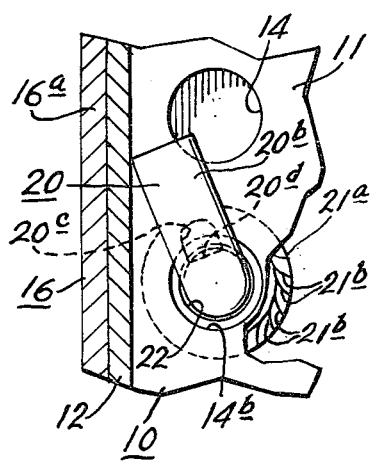
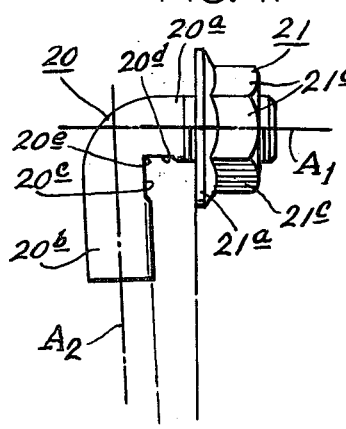
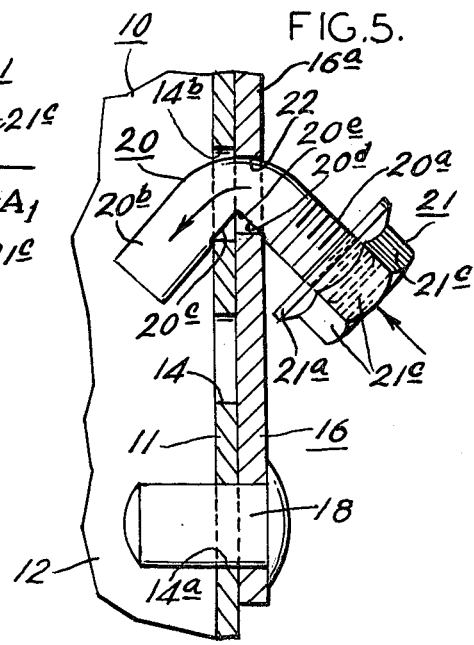

POSITIVE-LOCKING RELEASABLE CONNECTOR FOR STORAGE RACK HAVING VERTICALLY ADJUSTABLE LOAD SUPPORTS

The present invention relates to storage structures, and more particularly, the present invention relates to locking assemblies for releasably fastening load supports at selected vertical levels in storage racks.

Storage racks having vertically-adjustable shelving are known. An example of such a storage rack is disclosed in U.S. Pat. 3,545,626. In the patented storage rack, load supports span horizontally between uprights or columns having rows of vertically-spaced apertures therein. Each load support has column-engaging clips mounted at opposite ends thereof. Each clip has at least one pin which extends into one of the apertures in the column to prevent vertical movement of the clip relative to the column. In addition, each clip mounts a locking assembly which extends through another one of the apertures in the column to maintain the clip releasably engaged with the column.

Each of the locking assemblies disclosed in the above patent has a shank, a lug on one end of the shank, and means on the other end of the shank to turn the same. The shank extends through a hole in the clip which is in partial registry with an aperture in the column. The lug engages the inside of the front flange of the column when the shank is turned 180° about its axis by the turning means. In the embodiments illustrated in FIGS. 1-9 of the patent, the turning means is provided by a handle. In the embodiment illustrated in FIGS. 10-11 of the patent, the turning means is provided by a head having wrench flats.

Although the locking assemblies disclosed in the aforementioned patent function satisfactorily in most applications, there are applications in which a higher strength locking action is desirable. For instance, such a locking action is desirable in applications where moving lift trucks are likely to strike the load supports. Depending on the force with which a truck strikes, the load support, stresses of sufficient magnitude may be applied to the locking assembly as to loosen the same and/or to cause it to fail.

With the foregoing in mind, it is a primary object of the present invention to provide an improved locking assembly for releasably securing load supports in a storage structure.

It is another object of the present invention to provide a relatively simple yet high strength locking assembly for releasably securing load supports at various levels in a storage rack.

A still further object of the present invention is to provide, for a storage rack having vertically-adjustable load supports, a relatively strong locking assembly which can be mass-produced economically, which is resistant to loosening even under severe service conditions, and which affords mounting and dismounting of the load supports at various levels with a minimum of labor.

More specifically, the present invention provides a locking assembly for releasably securing a load support to a column in a storage rack. The column has a front flange with a row of apertures therein and a side flange extending along the row of apertures. A clip is mounted at one end of the load support. The clip has a web which engages flush against the front flange and a hole which registers with one of the apertures in the column. The clip also has at least one pin which extends into another one of the apertures in the column. The locking assembly comprises an angulated connector member having a threaded shank which extends through the clip hole into the column aperture and having a lug which engages the rear of the front flange of the column. A nut threadedly engaged with the shank has an integral annular flange engaging the front of the clip when the lug is engaged against the inside of the front flange of the column. The connector member is fabricated of steel which is bent so as to dispose the lug at less than a right angle with respect to the chank. Thus, when the nut is tightened, the lug flexes with respect to the shank to establish a spring-like locking action to prevent the nut from loosening. Moreover, the lug is dimensioned lengthwise so as to engage the inside of the side flange when the nut is tightened. As a result, the side flange cooperates with the lug to prevent the shank from rotating when the nut is tightened and loosened.

These and other objects, features and adgantages of the present invention should become apparent from the following description when taken in conjunction with the accompanying drawing, in which:

FIG. 1 is a front-elevational view of a locking assembly embodying the present invention;

FIG. 2 is a sectional view taken along line 2—2 of FIG. 1;

FIG. 3 is a slightly enlarged sectional view taken along line 3—3 of FIG. 2;

FIG. 4 is a full scale, side elevational view of a connector member prior to installation; and FIG. 5 is a fragmentary, sectional view illustrating the connector member of FIG. 4 being installed.

Referring now to the drawing, FIG. 1 illustrates a storage rack column 10 having a front flange 11 and a pair of integral side flanges 12,12 each with inturned rear flanges 13,13 forming the column 10 with a substantially rectangular cross-sectional configuration. The front flange 11 of the columm has two rows of evenly-spaced apertures 13,13 and 14,14 located closely adjacent the side flanges 12,12 for the purpose of mounting a load support member 15 at various levels to the column 10. The load support 15 mounts at each end, a clip 16 having a front web 16a adapted to engage flush against the front flange 11 of the column 10 and having a side web 16b adapted to engage flush against the right hand side flange 12 of the column 10. As best seen in FIG. 2, at least one pin, and preferably two pins 18,18 extend from the front web 16a of the clip 16 through two of the apertures 14a,14a in the front flange 11 of the column 10. The pins 18,18 function to transfer the load on the load support 15 to the column 10.

As described thus far, the rack structure is conventional, and for a more detailed description of such a storage rack structure, reference is made to U.S. Pat. 3,545,626 which is incorporated by reference herein.

In accordance with the present invention, an improved high-strength locking assembly is provided to releasably secure the load support clip 16 to the column 10 at various levels. To this end, the locking assembly comprises a substantially L-shaped angulated connector member 20 and a nut 21 (FIG. 4). The connector member 20 has a threaded shank 20a and a lug 20b integral therewith. The nut 21 is threadedly engaged with the threaded shank 20a, and the nut 21 has an integral annular flange 21a with a flat rear face having a series of circumferentially spaced gripping ribs 21b,21b adapted to engage the front of the clip web 16a. See FIG. 3. As best seen in FIG. 1, the nut 21 has a series of wrench flats 21c,21c which are circumscribed by the annular flange 21a.

In the illustrated embodiment, the axis $A_1$ of the shank 20a defines with the axis $A_2$ of the lug 20b an included angle of slightly less than 90° when the connector member 20 is in a relaxed or unstressed condition as illustrated in FIG. 4. The rear face of the flange 21a of the nut 21 is othogonal to the axis $A_1$ of the shank 20a of the connector member 20. Also, the length of the lug 20b, measured from the intersection of the axes $A_1$ and $A_2$, is greater than the distance between the center of the aperture 14b in the front flange 11 of the column 10 and the side flange 12 thereof. Preferably, the shank 20a and the lug 20b are of about the same length measured from the intersection of their respective axes $A_1$ and $A_2$.

As best seen in FIG. 5, the front web 16a of the clip 16 has a circular hole 22 which is slightly smaller in diameter than the diameter of the aperture 14b in the front flange 11 of the column 10. The holes 22 and 14b are aliged with one another when the pins 18,18 are engaged in their respective apertures 14a,14a in the front flange 11 of the column 10. The connector member 20 has a circular cross-section which is sized as to permit the lug 20b to be inserted endwise into the hole 22 and pivoted in the direction indicated by the arrows in FIG. 5. Preferably, the hole 22 is only slightly larger in diameter than the shank 20a to provide a slight clearance, as illustrated in FIG. 2.

The connector member 20 has a pair of flat surfaces 20c and 20d which define a recessed bight 20e at the juncture of the shank 20a and lug 20b to provide a clearance enabling the connector member 20 to be pivoted during installation in the manner illustrated in FIG. 5. It is preferable for the connector member 20 to be inserted with the nut 21 engaged with the shank 20a and backed off as much as possible, as indicated in FIG. 5, in order to prevent the shank 20a from being pushed through the column aperture 14a and lost inadvertently in the column 10.

After the connector member 20 is installed the shank 20a is pivoted clockwise (FIG. 1) to cause the lug 20b to engage the inside of the side flange 12 above the aperture 14b as illustrated in FIGS. 1 and 3. This is possible because the lug 20b is longer than the spacing between the axis of the aperture 14b and the side flange 12. As a result, when the nut 21 is tightened by a wrench (not shown) the side flange 12 provides a reaction surface in close proximity with the aperture 14b, which surface cooperates with the lug 20b to react against the torque applied on the shank 20a as the nut 21 is rotated. As a result, a considerable amount of torque can be applied to the nut 21 to secure it against loosening. Of course, in loosening the nut 21, the shank 20a rotates counterclockwise, and the lug 20b engages the side flange 12 below the aperture 14b.

In the present invention, the connector member 20 is bent from steel which flexes elastically within limits when the nut 21 is tightened. For instance, tightening of the nut 21 causes the angle between the shank 20a and the lug 20b to increase and the lug 20b to flex elastically with respect to the shank 20a. This is ensured by virtue of the orthogonal disposition of the rear face of the nut flange 21a with respect to the shank 20a. As a result, stresses are created in the connector member 20 which maintain the nut 21 firmly engaged against the front of the clip web 16a so that the nut 21 resists loosening. In addition, the edges of the surface 20d on the shank 20a engage the peripheral edge of the aperture 22 in the clip web 16a when the nut 21 is drawn tight to provide additional means for preventing loosening of the nut 21.

The connector member 20 is formed by bending a preselected length of threaded rod to the proper angle in a die having a roller with peripheral mating threads rotatable about an axis perpendicular to the plane of the bend. The roller protects the threads of the threaded shank 20a during bending. At the same time, the flat surfaces 20c and 20d are coined in the die. Thus, the connector member 20 is capable of being mass-produced economically.

From the foregoing, it should be apparent that the locking assembly of the present invention prevents the load support 15 from being pulled away from the column 11 even when substantial forces are applied to the load support 15. Accordingly, the locking assembly of the present invention is highly reliable in use, is simple in construction, and can be readily connected and disconnected with only a wrench and a minimum of labor.

Thus, while a preferred embodiment of the present invention has been described in detail, various modifications, alterations and changes may be made without departing from the spirit and scope of the present invention as defined in the appended claims.

We claim:

1. In combination with a storage rack column having a front flange with at least one aperture therein and a side flange extending along said front flange in close proximity with said aperture, a clip having a web with a hole adapted to at least partially register with said one aperture when said clip web is engaged flush against the front flange of the column, and means releasably fastening said clip to said column, the improvement wherein said releasable fastening means comprises: an angulated connector member having a threaded shank extending through said hole in said clip and said one aperture in said column and having a lug engaging the rear of the front flange of the column and being dimensioned lengthwise to extend away from said aperture a predetermined distance to engage said side column flange when inserted into said column, a nut threadedly engaged with said shank and engaging the front of said clip when said lug is operatively engaged in the column, said side column flange providing a reaction surface located inside said column in close proximity with said aperture so as to engage said lug and resist rotation thereof when said nut is tightened, said lug defining with said shank less than an orthogonal included angle so that said connector lug engages the inside of the front flange at a location spaced from said one aperture when said connector member is in a relaxed condition and said nut is engaged against the front of said clip, said connector member being fabricated of an elastically deformable material affording elastic flexure of said lug relative to said shank when said connector member is tensioned upon rotation of said nut and pressure engagement thereof with the front of said clip, said nut having a series of peripheral wrench flats and an annular flange having a clip-engaging surface extending radially outward beyond said flats orthogonal to the axis of the shank, said connector member having surface means forming an inwardly-facing recess at the juncture of said shank with said lug to facilitate insertion and withdrawal of said connector member, said clip hole and flange aperture being aligned with one another and said flange aperture being larger than said clip hole, said lug being sized to afford its passage axially through said hole in said clip and said aperture in said column front flange when said clip web is engaged against the front of said column and to pivot relative to said column into a position wherein said shank is coaxial with the hole in said clip whereby the connector member can be inserted into the column and withdrawn therefrom by a workman located in front of the column.

2. Apparatus according to claim 1 wherein said column front flange includes a series of apertures arranged in a row with said one aperture, and including at least one pin extending from said clip into another aperture in said row to prevent movement of said clip axially relative to said column.

3. Apparatus according to claim 2 wherein said lug and shank are integral and have substantially equal lengths.

* * * * *